United States Patent
Belling et al.

(10) Patent No.: US 12,538,383 B2
(45) Date of Patent: Jan. 27, 2026

(54) SUPPORT OF MULTICAST FOR TERMINAL ENDPOINT DEVICES

(71) Applicant: NOKIA TECHNOLOGIES OY, Espoo (FI)

(72) Inventors: Horst Thomas Belling, Erding (DE); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 229 days.

(21) Appl. No.: 18/021,054

(22) PCT Filed: Aug. 12, 2020

(86) PCT No.: PCT/EP2020/072627
§ 371 (c)(1),
(2) Date: Feb. 13, 2023

(87) PCT Pub. No.: WO2022/033674
PCT Pub. Date: Feb. 17, 2022

(65) Prior Publication Data
US 2023/0309188 A1    Sep. 28, 2023

(51) Int. Cl.
*H04W 76/40*     (2018.01)
*H04W 8/18*      (2009.01)

(52) U.S. Cl.
CPC ........... *H04W 76/40* (2018.02); *H04W 8/186* (2013.01)

(58) Field of Classification Search
CPC ....... H04W 76/40; H04W 8/186; H04W 4/06; H04L 12/185; H04L 12/189;
(Continued)

(56) References Cited

U.S. PATENT DOCUMENTS

2016/0150590 A1*  5/2016  Pocha ............... H04L 12/185
                                                      370/329
2018/0210944 A1   7/2018  Sukhanov et al.
(Continued)

FOREIGN PATENT DOCUMENTS

| CN | 108769969 A   | 11/2018 |
|----|---------------|---------|
| WO | 2019/091456 A1| 5/2019  |
| WO | 2019/136128 A1| 7/2019  |

OTHER PUBLICATIONS

International Search Report & Written Opinion dated Apr. 23, 2021 corresponding to International Patent Application No. PCT/EP2020/072627.
(Continued)

*Primary Examiner* — Jason E Mattis
*Assistant Examiner* — Robert Ma
(74) *Attorney, Agent, or Firm* — Lippes Mathias LLP

(57) ABSTRACT

An apparatus, comprising at least one processing circuitry, and at least one memory for storing instructions to be executed by the at least one processing circuitry, wherein the at least one memory and the instructions are configured to, with the at least one processing circuitry, cause the apparatus at least to receive a request for joining a terminal endpoint device to an established multicast session; based on the received request, subscribe at a network entity to one or several notifications, the one or several notifications indicating whether data to be transmitted for the established multicast session is available for multicasting; obtain a subscribed notification from the network entity if data for the established multicast session is available for multicasting; and responsive to the obtained subscribed notification, issue for the established multicast session a downlink data notification for the terminal endpoint device.

14 Claims, 9 Drawing Sheets

(58) Field of Classification Search
CPC ............... H04L 65/1069; H04L 65/611; H04L 65/1016; H04N 21/222; H04N 21/6405
See application file for complete search history.

(56) References Cited

U.S. PATENT DOCUMENTS

| | | | |
|---|---|---|---|
| 2020/0097690 A1 | 3/2020 | Wan et al. | |
| 2020/0267513 A1* | 8/2020 | Zhu | H04N 21/6181 |
| 2023/0199806 A1* | 6/2023 | Li | H04W 40/36 370/329 |

OTHER PUBLICATIONS

3GPP TR 23.757 V0.4.0 (Jun. 2020), Technical Report, 3rd Generation Partnership Project; Technical Specification Group Services and System Aspects; Study on architectural enhancements for 5G multicast-broadcast services (Release 17), Jun. 2020.

"3rd Generation Partnership Project; Technical Specification Group Services and System Aspects; System architecture for the 5G System (5GS); Stage 2 (Release 16)", 3GPP TS 23.501 V16.4.0, Mar. 2020, pp. 1-430.

"3rd Generation Partnership Project; Technical Specification Group Services and System Aspects; Architectural enhancements for 5G multicast-broadcast services; Stage 2 (Release 18)", 3GPP TS 23.247 V18.0.0, Dec. 2022, pp. 1-122.

"KI#1: New Solution for MBS Session (activate, deactivate)", 3GPP TSG-WG SA2 Meeting #140E e-meeting, S2-2006308, Agenda: 8.9, Huawei, Aug. 19-Sep. 1, 2020, pp. 1-8.

Office action received for corresponding European Patent Application No. 20756839.5, dated Jan. 9, 2025, 5 pages.

Office Action received for corresponding Chinese Patent Application No. 202180050649.2, dated Jun. 29, 2025, 10 pages of Office Action and no page of translation available.

Miao et al., "Class Imbalance Learning for Identifying NLOS in UWB Positioning", Journal of Signal Processing, vol. 32, No. 01, Jan. 2016, pp. 8-13.

Song et al., "NLOS Identification Approach in UWB Positioning Based on Class—Imbalance Classification", Journal of Information Engineering University, vol. 20, No. 02, Apr. 2019, pp. 147-153.

Miao et al., "Application of One-Class Classification in NLOS Identification of UWB Positioning", International Conference on Information System and Artificial Intelligence, Jun. 24-26, 2016, pp. 318-322.

* cited by examiner

SUPPORT OF MULTICAST FOR TERMINAL ENDPOINT DEVICES

TECHNICAL FIELD

The present disclosure relates to support of multicast for terminal endpoint devices, e.g. user equipments (UEs).

Examples of embodiments relate to apparatuses, methods and computer program products relating to support of multicast for terminal endpoint devices.

BACKGROUND ART

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

In this regard, enhancements for 5G multicast-broadcast services are currently studied. Accordingly, a solution assumes that a UE joins a multicast session using signaling related to a unicast Protocol Data Unit (PDU) session and that a mobility of the UE is handled via this unicast PDU session [TR 23.757]. Specifically, detection of multicast data (data available for multicasting; received data to be transmitted for a multicast session) by a user plane function (UPF) as trigger for multicast session establishment is disclosed in the prior art. However, there may be problems arising, if the UE is in idle or inactive mode.

Particularly, it is possible for UEs to join a multicast session and change their connectivity mode while no content is transmitted, e.g. prior to a start of transmission, or in speech pauses for public safety. UEs could then go to idle mode (radio resource control idle mode, RRC_IDLE mode), which is, however, in particular problematic, as a Radio Access Network (RAN) node can change in idle mode. Such UEs would need to be paged upon reception of first downlink multicast data. There is also a problem for UEs going to an inactive mode (RRC_INACTIVE mode), in particular, if a multicast distribution tree is not being updated for the inactive UEs in order to avoid signaling. The multicast distribution tree may be understand to represent a plurality of paths originating from one source point, wherein each individual path terminates at a respective individual termination point. Thus, each path may originate from one network entity and may e.g. terminate at a respective terminal endpoint device, wherein each path may run over (an individual number of) one or more further network entities (e.g. network communication elements or functions, etc.). Such inactive UEs would also need to be paged upon reception of first downlink multicast data.

REFERENCES

[TR 23.757] 3GPP TR 23.757; Technical Specification Group Services and System Aspects—Study on architectural enhancements for 5G multicast-broadcast services; Release 17; Volume 03; January 2020

Abbreviations used in this specification:
2G Second Generation
3G Third Generation
3GPP $3^{rd}$ Generation Partnership Project
3GGP2 $3^{rd}$ Generation Partnership Project 2
4G Fourth Generation
5G Fifth Generation
AMF Access Mobility Function
AP Access Point
BM-SC Broadcast/Multicast Service Center
BS Base Station
DSL Digital Subscriber Line
EDGE Enhanced Data Rates for Global Evolution
EEPROM Electrically Erasable Programmable Read-only Memory
eNB Evolved Node B
ETSI European Telecommunications Standards Institute
gNB Next Generation Node B
GPRS General Packet Radio System
GSM Global System for Mobile communications
IEEE Institute of Electrical and Electronics Engineers
IETF Internet Engineering Task Force
ISDN Integrated Services Digital Network
ITU International Telecommunication Union
LTE Long Term Evolution
LTE-A Long Term Evolution-Advanced
MANETs Mobile Ad-Hoc Networks
NB Node B
NEF Network Exposure Function
PCS Personal Communications Services
PDU Protocol Data Unit
RAM Random Access Memeory
RAN Radio Access Network
RNA RAN Notification Area
ROM Read Only Memory
RRC Radio Resource Control
SMF Session Management Function
TISPAN Telecoms & Internet converged Services & Protocols for Advanced Networks
TNLI Transport Network Layer Information
UDR Unified Data Repository
UE User Equipment
UMTS Universal Mobile Telecommunications System
UPF User Plane Function
UWB Ultra-Wideband WCDMA Wideband Code Division Multiple Access
WiMAX Worldwide Interoperability for Microwave Access
WLAN Wireless Local Area Network

SUMMARY

Various exemplary embodiments of the present disclosure aim at addressing at least part of the above issues and/or problems and drawbacks.

Various aspects of exemplary embodiments of the present disclosure are set out in the appended claims.

According to examples of embodiments, there is provided, for example, an apparatus according to claim 1, and an apparatus according to claim 8. Further advantageous developments with respect to the apparatuses are defined in the respective dependent claims 2 to 7 and 9.

In addition, according to examples of embodiments, there is provided, for example, a method according to claim 23. Further advantageous developments with respect to the methods are defined in the respective dependent claim 24.

Any one of the above mentioned aspects provides a support of multicast for idle and inactive UEs to thereby solve at least part of the problems and drawbacks identified in relation to the prior art.

Thus, improvement is achieved by apparatuses, methods, and computer program products providing support of multicast for idle and inactive UEs.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
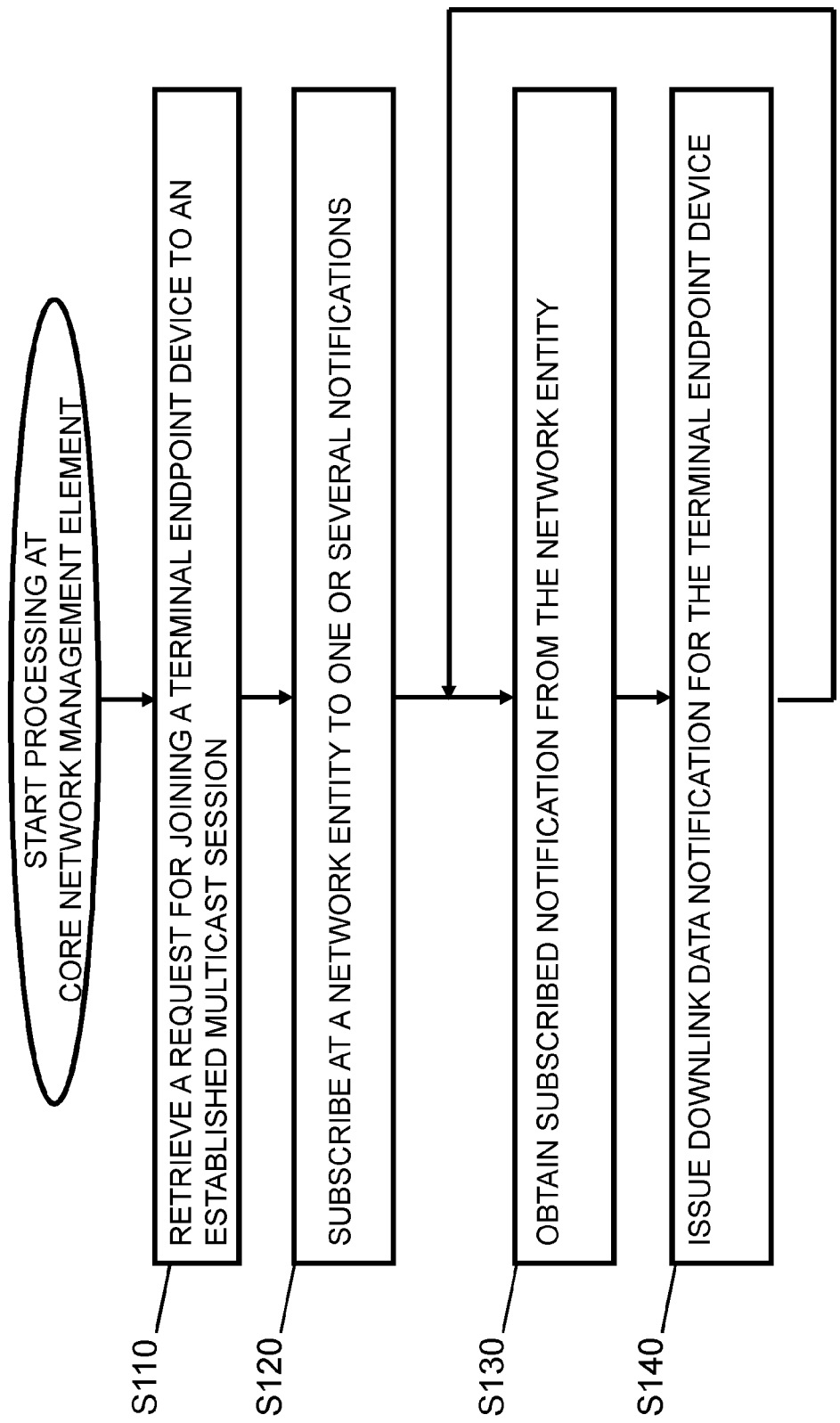
FIG. 1 shows a flowchart illustrating steps corresponding to a method for being implemented at a core network management element according to various examples of embodiments.

Basically, for properly establishing and handling a communication between two or more end points (e.g. communication stations or elements or functions, such as terminal devices, UEs, or other communication network elements, a database, a server, host etc.), one or more network elements or functions (e.g. virtualized network functions), such as communication network control elements or functions, for example access network elements like access points, radio base stations, relay stations, eNBs, gNBs etc., core network control elements or functions, for example control nodes, support nodes, service nodes, gateways, user plane functions, access and mobility functions etc., core network storage elements or functions, for example user data repository, and core network management elements or functions, for example session management functions, access and mobility management functions, etc., may be involved, which may belong to one communication network system or different communication network systems.

For handling/setting signaling flows subsequent/further to the detection of multicast data by a UPF, however, it is not even considered in the prior art that the ingress node and the session management function (SMF) are different. In contrast thereto, an underlying idea of the present disclosure is to provide support of multicast for terminal endpoint devices, especially for idle and inactive terminal endpoint devices, by considering that the ingress node and the SMF are different.

The present disclosure thus provides, according to various examples of embodiments as outlined below in detail, a flexible and/or (time and/or resource) efficient solution to support multicast for terminal endpoint devices.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks like 4G and/or LTE where mobile communication principles are integrated, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network or datacenter networking.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions (core network control elements or network functions, core network management elements or network functions), such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an eNB/gNB, a radio network controller, a core network control element or function, such as a gateway element, or other network elements or functions, as described herein, core network management element or function, such as a session management function, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Referring now to FIG. 1, there is shown a flowchart illustrating steps corresponding to a method implemented at a core network management element according to various examples of embodiments In particular, according to FIG. 1, in S110, a request for joining a terminal endpoint device to an established multicast session is received. Further, in S120, based on the received request, subscribing at a network entity to one or several notifications is performed, wherein the one or several notifications indicate whether data to be transmitted for the established multicast session is available for multicasting. In this context, is has to be considered that the notification does not necessarily arrive immediately but can arrive at a later point in time. Further, the notification will be sent again, when new data arrive after a silence period (i.e. every time new data are available for multicasting, e.g. every time when new data arrive after a respective silence period, a corresponding notification will be sent). Therefore, the method as illustrated according to FIG. 1 does not end when a first notification has been received or when a notification is not received immediately. Rather, as derivable from FIG. 1, subscribing at the network entity in S120 may be performed only once, whereas the subsequent method steps (S130 and S140) may be repeated, as outlined below.

Further, in S130, a subscribed notification from the network entity is obtained. Furthermore, in S140, responsive to the obtained subscribed notification, downlink data notification for the terminal endpoint device is issued for the established multicast session. In this context, similar to directly above, it has to be considered that a new downlink data notification will be issued, when a new subscribed notification is obtained. Therefore, the method as illustrated according to FIG. 1 does not end when a first downlink data notification (in response to an obtained first subscribed notification) has been issued.

Further, according to at least some examples of embodiments, the network entity may be a core network storage element. In this case, the method further comprises the steps of obtaining the subscribed notification from an attribute information stored for the established multicast session in the core network storage element. The attribute information indicates whether data to be transmitted is available for multicasting.

Additionally, according to various examples of embodiments, a multicast data transmission status assigned to the established multicast session may be in an inactive status. In this case, if data to be transmitted for the established multicast session is available for multicasting, the method further comprises the steps of obtaining the subscribed notification from the attribute information. The attribute information indicates a switching of the multicast data transmission status from the inactive status to an active status.

Alternatively, according to various examples of embodiments, the network entity may be a core network control element assigned to the established multicast session.

Optionally, according to at least some examples of embodiments, data to be transmitted for the established multicast session is available for multicasting after a silence period.

Furthermore, according to various examples of embodiments, the method may further comprise the steps of issuing the downlink data notification for the terminal endpoint device, the terminal endpoint device being in an idle status or in an inactive status.

Moreover, according to various examples of embodiments, the method may further comprise the steps of handling a Protocol Data Unit, PDU, session where the request for joining the terminal endpoint device is received; issuing for the established multicast session the downlink data notification for the handled PDU session.

The above described method, which may be implemented at a core network management element like a SMF, thus provides, according to various examples of embodiments, a flexible and/or (time and/or resource) efficient solution to support multicast for terminal endpoint devices.

Figure 2:
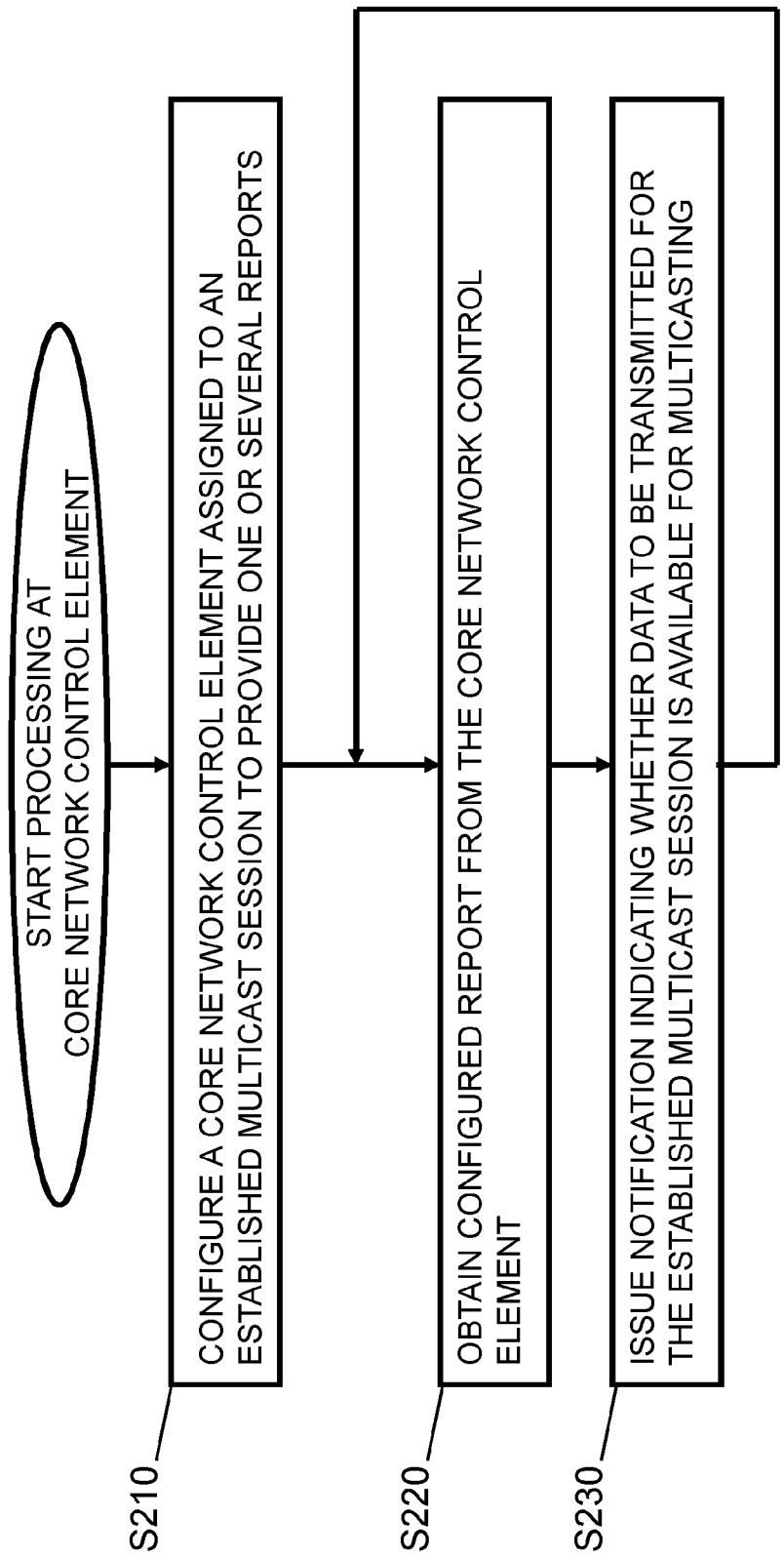
FIG. 2 shows a flowchart illustrating steps corresponding to a method for being implemented at a core network control element according to various examples of embodiments.

Referring now to FIG. 2, there is shown a flowchart illustrating steps corresponding to a method implemented at a core network control element according to various examples of embodiments.

In particular, according to FIG. 2, in S210, a core network control element assigned to an established multicast session is configured to provide one or several reports. The one or several reports indicate whether data to be transmitted for the established multicast session is available for multicasting. A configured report is provided when new data are becoming available after a period where no data were received. The configured report is also provided when no data have been available for a period of time and data had been received before that period. Further, in S220, the configured report from the core network control element is obtained. In addition, in S230, responsive to the obtained report, a notification is issued indicting whether data to be transmitted for the established multicast session is available for multicasting. Steps S220 and S230 may be repeated.

Furthermore, according to at least some examples of embodiments, the method may further comprise the steps of issuing the notification by updating an attribute information stored for the established multicast session in a core network storage element. The attribute information indicates whether data to be transmitted is available for multicasting.

In addition, according to various examples of embodiments, a multicast data transmission status assigned to the established multicast session may be in an inactive status. In this case, if data for the established multicast session is available for multicasting, the method further comprises the steps of updating the attribute information by switching the multicast data transmission status from the inactive status to an active status.

Alternatively, according to various examples of embodiments, the method may further comprise the steps of accepting a subscribing request to notify a core network management element whether data to be transmitted for the established multicast session is available for multicasting; and issuing the notification indicting whether data to be transmitted for the established multicast session is available for multicasting to the core network management element.

Optionally, according to at least some examples of embodiments, the method further comprises the steps of configuring the core network control element for providing the configured report if signaling data indicating for the established multicast session the availability of data available for multicasting after a first predetermined period.

Moreover, according to various examples of embodiments, the method may further comprise the steps of configuring the core network control element to provide another configured report, wherein the another configured report is to be provided if no data to be transmitted is available for multicasting for a second predetermined period.

The above described method, which may be implemented at a core network control element like an Ingress Core Node, thus provides, according to various examples of embodiments, a flexible and/or (time and/or resource) efficient solution to support multicast for terminal endpoint devices.

Figure 3:
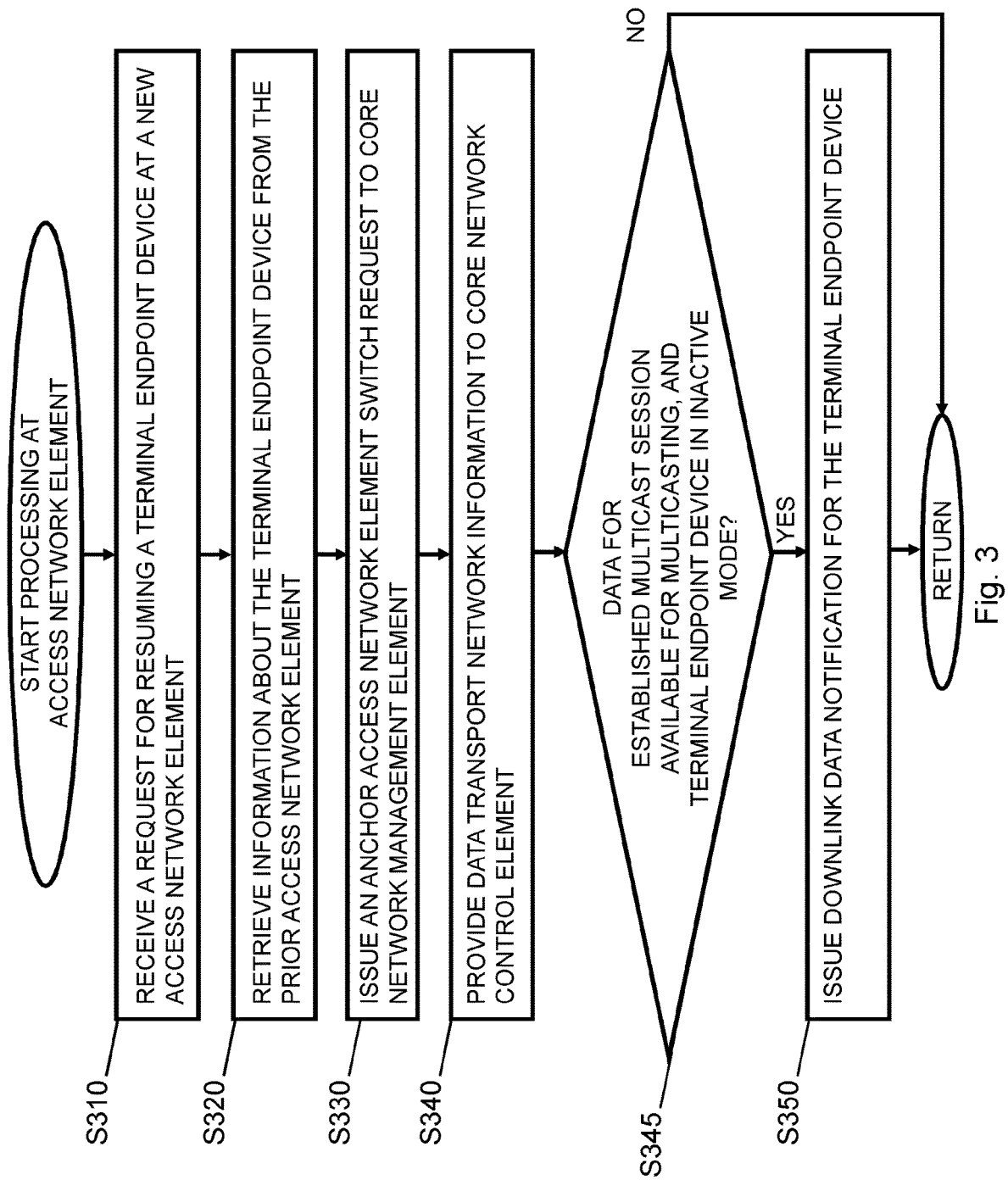
FIG. 3 shows a flowchart illustrating steps corresponding to a method for being implemented at an access network element according to various examples of embodiments.

Referring now to FIG. 3, there is shown a flowchart illustrating steps corresponding to a method implemented at an access network element according to various examples of embodiments.

In particular, according to FIG. 3, in optional step S310, a request for resuming a terminal endpoint device is received. The terminal endpoint device exits a first notification area assigned to a first access network element and enters a second notification area assigned to a second access network element. The terminal endpoint device is to be resumed at the second access network element.

Further, in optional step S320, information about the terminal endpoint device are retrieved from the first access network element.

In addition, in optional step S330, after the terminal endpoint device has resumed at the second access network element, an anchor access network element switch request to a core network management element is issued. The anchor access network element switch request indicates that the second access network element replaces the first access network element as an anchor access network element for the terminal endpoint device. The second access network element therefore replaces the first communication network control as the anchor access network element.

Furthermore, in S340, data transport network information are provided to a core network control element for receiving, for an established multicast session the terminal endpoint device has joined, data to be transmitted for the established multicast session.

Moreover, if data for the established multicast session is available for multicasting and the terminal endpoint device is in an inactive mode (YES in S345), in S350, a downlink data notification for the terminal endpoint device is issued. Otherwise (NO in S345), the processing ends.

The above described method, which may be implemented at an access network element like a RAN-Node, thus provides, according to various examples of embodiments, a flexible and/or (time and/or resource) efficient solution to support multicast for terminal endpoint devices.

In the following, further exemplary embodiments are described in relation to the above described methods.

Figure 4:
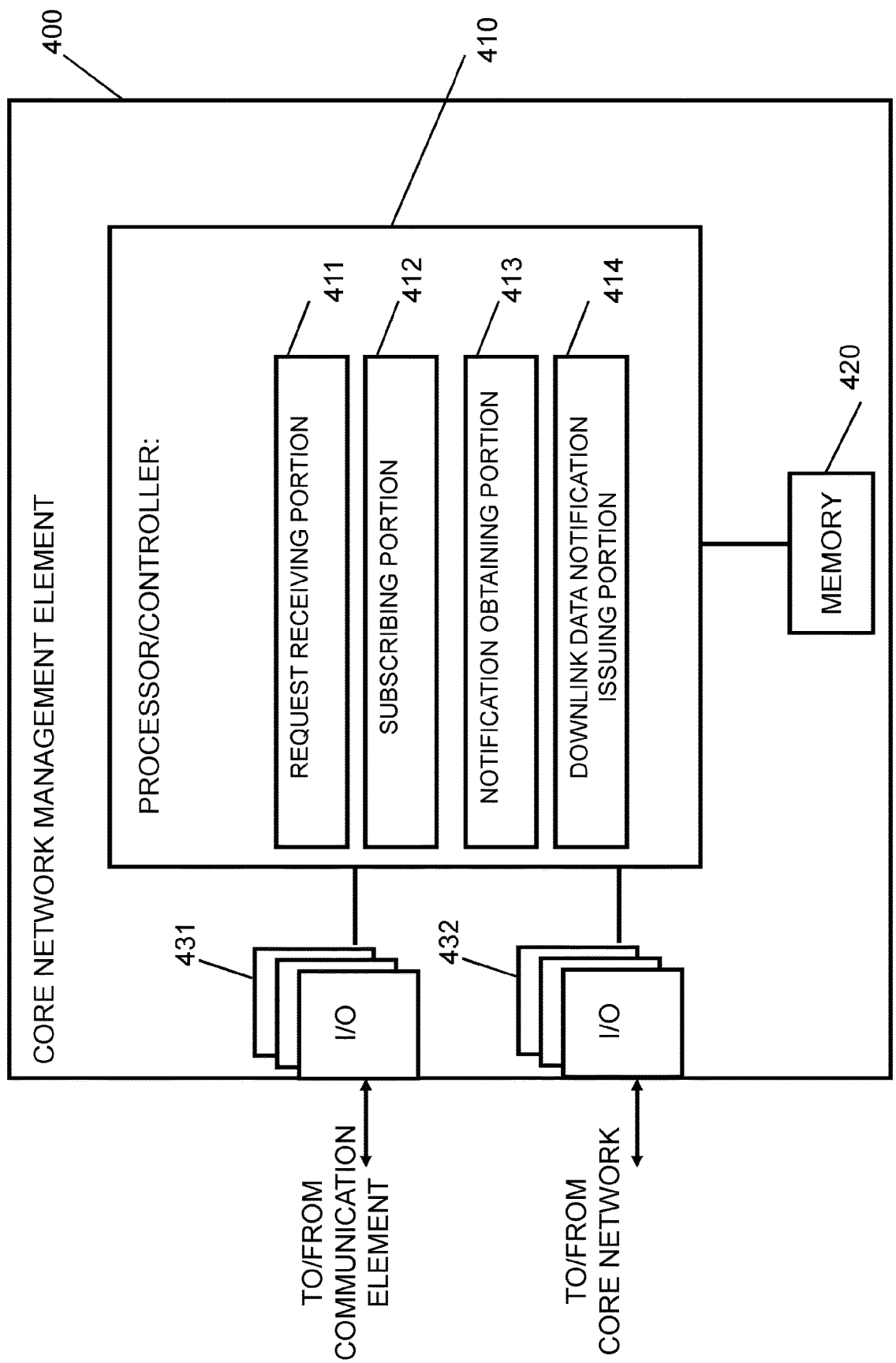
FIG. 4 shows a block diagram illustrating a core network management element according to various examples of embodiments.

FIG. 4 shows a block diagram illustrating an apparatus, e.g. a core network management element (or core network management function) according to various examples of embodiments, which may participate in a process to support multicast for idle and inactive UEs. Furthermore, even though reference is made to a core network management element (or core network management function), the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The above described method, which may be implemented at an access network element like a gNodeB, thus provides, according to various examples of embodiments, a flexible and/or (time and/or resource) efficient solution to support multicast for inactive UEs.

The communication element or function shown in FIG. 4 may include a processing circuitry, a processing function, a control unit or a processor 410, such as a CPU or the like, which is suitable to provide support of multicast for terminal endpoint devices. The processor 410 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 431 and 432 denote input/output (I/O) units or functions (interfaces) connected to the processor or processing function 410. The I/O units 431 and 432 may be a combined unit including communication equipment towards several entities, or may include a distributed structure with a plurality of different interfaces for different entities. Reference sign 420 denotes a memory usable, for example, for storing data and programs to be executed by the processor or processing function 410 and/or as a working storage of the processor or processing function 410. It is to be noted that the memory 420 may be implemented by using one or more memory portions of the same or different type of memory, but may also represent an external memory, e.g. an external database provided on a cloud server.

The processor or processing function 410 is configured to execute processing related to the above described communication control processing. In particular, the processor or processing circuitry or function 410 includes one or more of the following sub-portions. Sub-portion 411 is a processing portion which is usable as a portion for receiving a request. The portion 411 may be configured to perform processing according to S110 of FIG. 1. Furthermore, the processor or processing circuitry or function 410 may include a sub-portion 412 usable as a portion for subscribing to a notification. The portion 412 may be configured to perform a processing according to S120 of FIG. 1. In addition, the processor or processing circuitry or function 410 may include a sub-portion 413 usable as a portion for obtaining a notification. The portion 413 may be configured to perform a processing according to S130 of FIG. 1. Moreover, the processor or processing circuitry or function 410 may include a sub-portion 414 usable as a portion for issuing a downlink data notification. The portion 414 may be configured to perform a processing according to S140 of FIG. 1.

Figure 5:
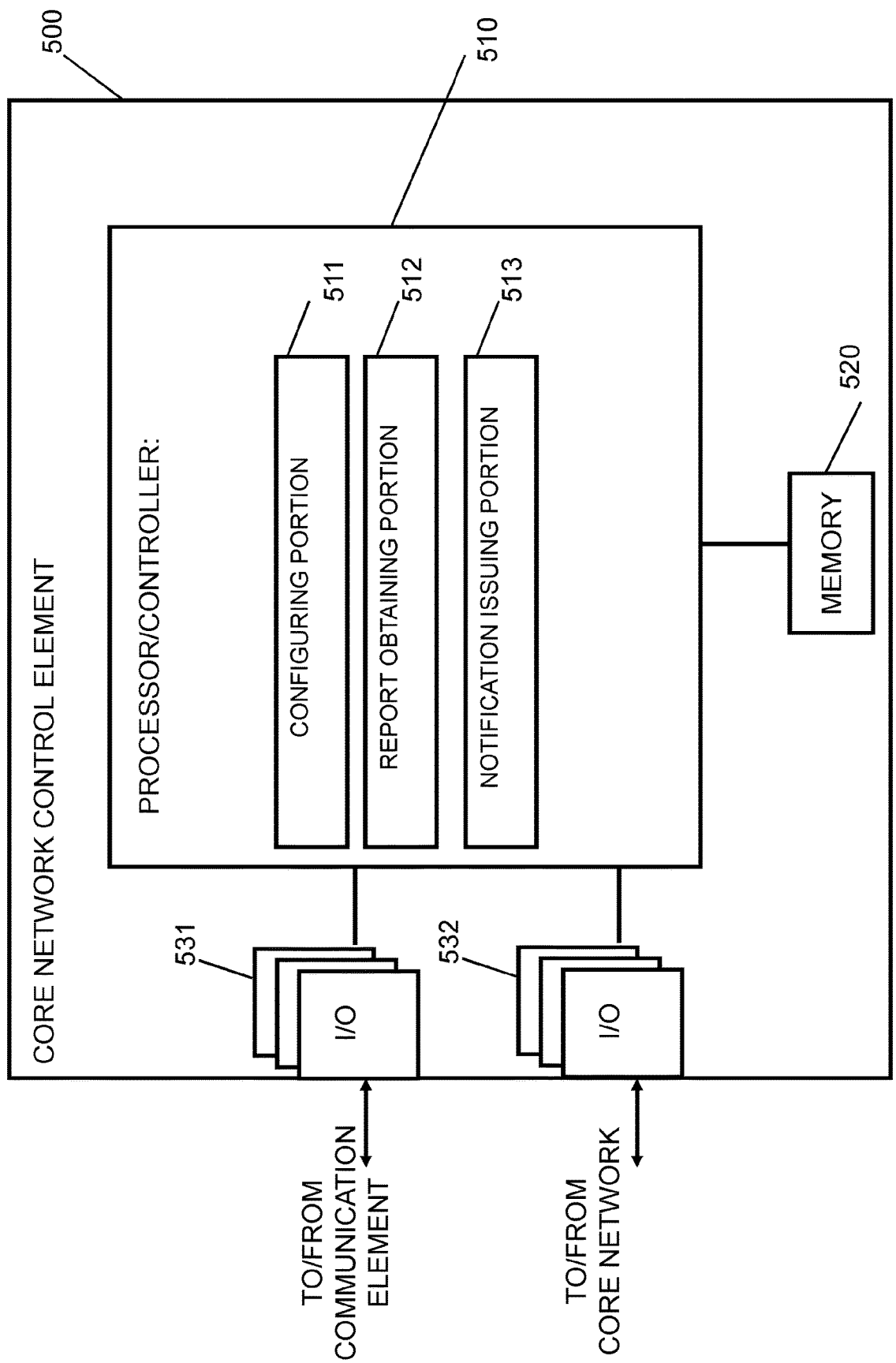
FIG. 5 shows a block diagram illustrating a core network control element according to various examples of embodiments.

FIG. 5 shows a block diagram illustrating an apparatus, e.g. a core network control element (or core network control function) according to various examples of embodiments, which may participate in a process to support multicast for idle and inactive UEs. Furthermore, even though reference is made to a core network control element (or core network control function), the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element or function shown in FIG. 5 may include a processing circuitry, a processing function, a control unit or a processor 510, such as a CPU or the like, which is suitable to provide support of multicast for terminal endpoint devices. The processor 510 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 531 and 532 denote input/output (I/O) units or functions (interfaces) connected to the processor or processing function 510. The I/O units 531 and 532 may be a combined unit including communication equipment towards several entities, or may include a distributed structure with a plurality of different interfaces for different entities. Reference sign 520 denotes a memory usable, for example, for storing data and programs to be executed by the processor or processing function 510 and/or as a working storage of the processor or processing function 510. It is to be noted that the memory 520 may be implemented by using one or more memory portions of the same or different type of memory, but may also represent an external memory, e.g. an external database provided on a cloud server.

The processor or processing function 510 is configured to execute processing related to the above described communication control processing. In particular, the processor or processing circuitry or function 510 includes one or more of the following sub-portions. Sub-portion 511 is a processing portion which is usable as a portion for configuring a core network control element. The portion 511 may be configured to perform processing according to S210 of FIG. 2. Furthermore, the processor or processing circuitry or function 510 may include a sub-portion 512 usable as a portion for obtaining a report. The portion 512 may be configured to perform a processing according to S220 of FIG. 2. In addition, the processor or processing circuitry or function 510 may include a sub-portion 513 usable as a portion for issuing a notification. The portion 513 may be configured to perform a processing according to S230 of FIG. 2.

Figure 6:
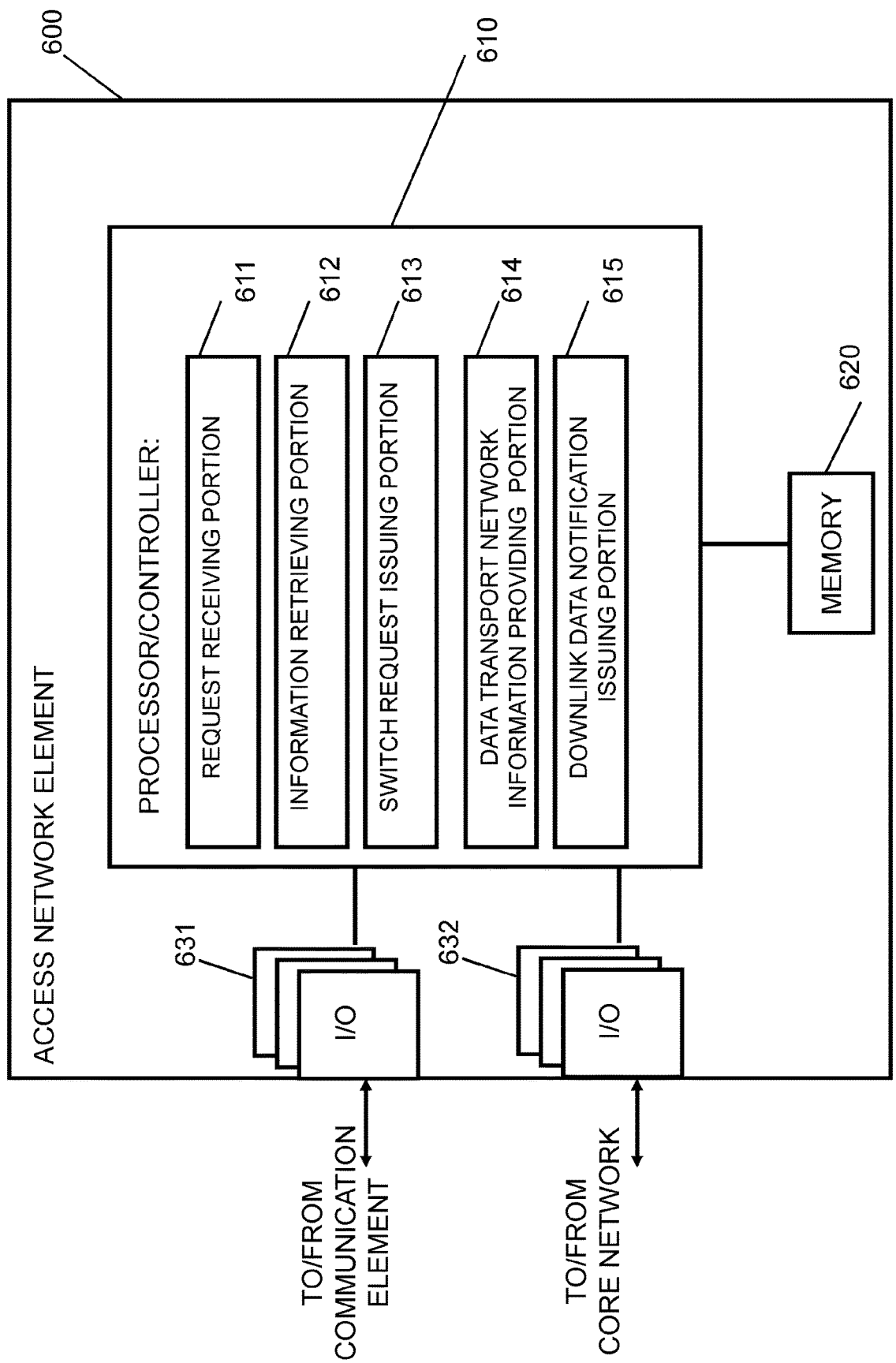
FIG. 6 shows a block diagram illustrating an access network element according to various examples of embodiments.

FIG. 6 shows a block diagram illustrating an apparatus, e.g. an access network element (or access network function) according to various examples of embodiments, which may participate in a process to support multicast for inactive UEs. Furthermore, even though reference is made to an access network element (or access network function), the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element or function shown in FIG. 6 may include a processing circuitry, a processing function, a control unit or a processor 610, such as a CPU or the like, which is suitable to provide support of multicast for terminal endpoint devices. The processor 610 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 631 and 632 denote input/output (I/O) units or functions (interfaces) connected to the processor or processing function 610. The I/O units 631 and 632 may be a combined unit including communication equipment towards several entities, or may include a distributed structure with a plurality of different interfaces for different entities. Reference sign 620 denotes a memory usable, for example, for storing data and programs to be executed by the processor or processing function 610 and/or as a working storage of the processor or processing function 610. It is to be noted that the memory 620 may be implemented by using one or more memory portions of the same or different type of memory, but may also represent an external memory, e.g. an external database provided on a cloud server.

The processor or processing function 610 is configured to execute processing related to the above described communication control processing. In particular, the processor or processing circuitry or function 610 includes one or more of the following sub-portions. Optional sub-portion 611 is a processing portion which is usable as a portion for receiving a request. The portion 611 may be configured to perform processing according to S310 of FIG. 3. Furthermore, the processor or processing circuitry or function 610 may include a sub-portion 612 usable as a portion for retrieving information. The portion 612 may be configured to perform a processing according to S320 of FIG. 3. In addition, the processor or processing circuitry or function 610 may include a sub-portion 613 usable as a portion for issuing a request. The portion 613 may be configured to perform a processing according to S330 of FIG. 3. Moreover, the processor or processing circuitry or function 610 may include a sub-portion 614 usable as a portion for providing transport network information. The portion 614 may be configured to perform a processing according to S340 of FIG. 3. Furthermore, the processor or processing circuitry or function 610 may include a sub-portion 615 usable as a portion for issuing a downlink data notification. The portion 615 may be configured to perform a processing according to S350 of FIG. 3.

In the following, further exemplary embodiments are described in relation to the above described methods and/or apparatuses.

Figure 7:
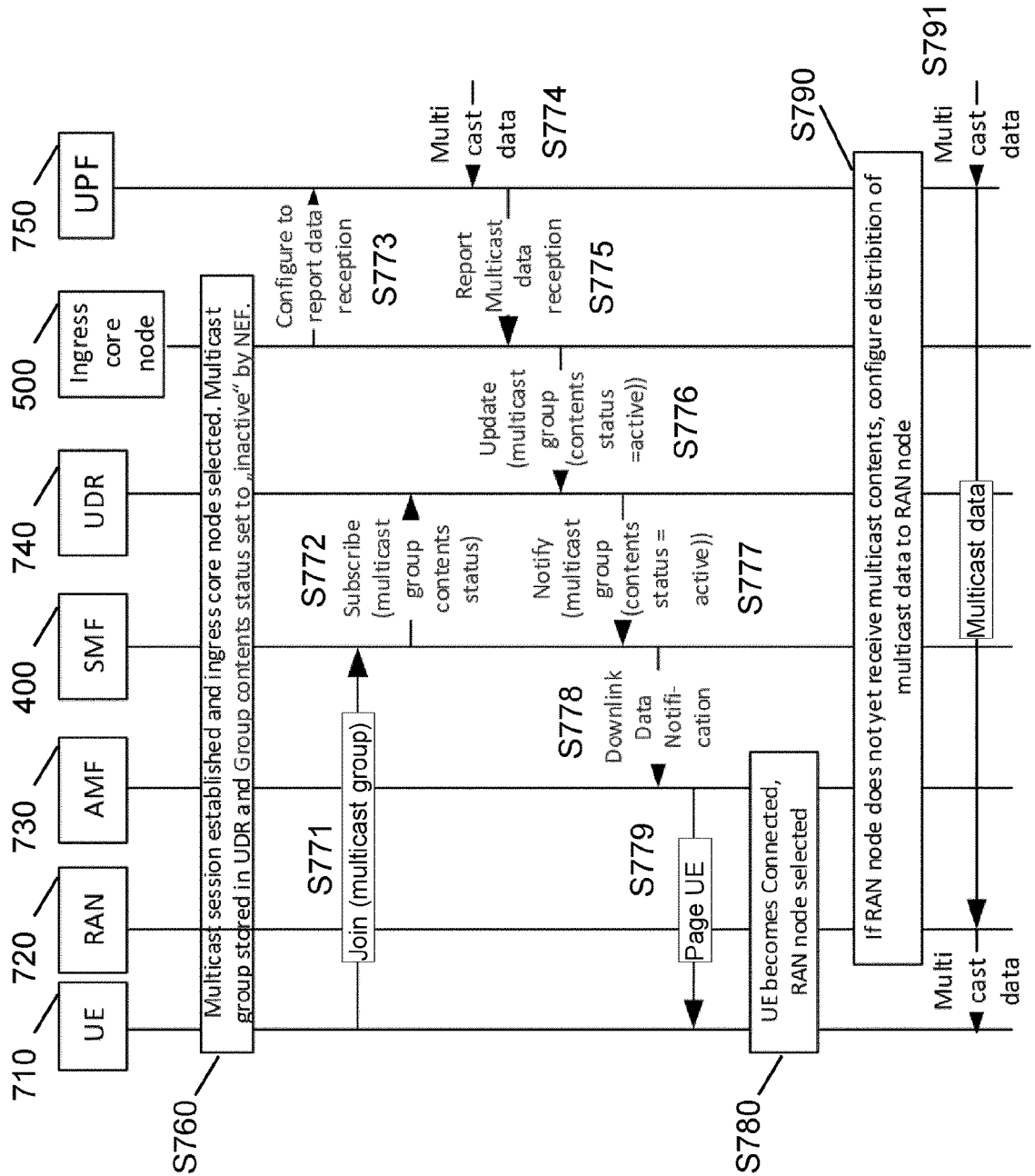
FIG. 7 shows a diagram schematically illustrating signaling flows according to various examples of embodiments.

FIG. 7 shows a diagram schematically illustrating signaling flows according to various examples of embodiments. Entities involved are illustrated in horizontal arrangement with the signaling transmitted among them. The time/sequence of signals is represented in the vertical direction.

In the following, it is to be noted that FIG. 7 illustrates a case, where a SMF 400 subscribed (S772) at an unified data repository (UDR) 740 for one or several notifications.

It is further to be noted that multicast data (S774) are available for multicasting in an established multicast session after e.g. a first silence period. With respect to the multicast data being available after the first silence period, one configured report is provided (S775) by an UPF 750 and received by an Ingress core node 500, one status update is performed (S776) by the Ingress core node 500 at the UDR 740, one notification is provided by the UDR 740 and obtained by the SMF 400, and one downlink data notification is issued by the SMF400.

Further, in case multicasting stops (no multicast of data in the established multicast session) for a configurable time period, a second silence period would begin. Furthermore, in case new multicast data being available for multicasting (S774), the second silence period would end and the above outlined process, starting from S775, would be restarted. That is, the UPF 750 would provide (S775) a further configured report, the Ingress core node 500 would perform (S776) a further status update (since the status would have been switched to "inactive" based on the second silence period), the UDR 740 would provide (S777) a further notification, and the SMF 400 would issue (S778) a further downlink data notification.

Therefore, it shall be understand that, although the SMF 400 may have subscribed at the UDR 740 (i.e. performed the subscribing process) only once, the SMF 400 may have subscribed for one or several notifications. In other words, it may not be necessary for the SMF 400 to subscribe anew for a notification, once multicasting of available data stops.

In particular, according to FIG. 7, a unified data repository (UDR) 740 stores for an established multicast session (S760), for which an Ingress core node 500 is selected, an attribute indicating whether contents (multicast data) for the multicast session are currently received. Further, a multicast group is stored in the UDR. The multicast group may e.g. comprise a plurality of different terminal endpoint devices, which have joined the established multicast session. Thus, the multicast group may represent a plurality of terminal endpoints to which data available for multicasting are forwarded/transmitted to. Such contents may be data, which are available for multicasting (for the established multicast session), wherein the indication of the attribute may be considered as an attribute information. Further, according to FIG. 7, the user plane function (UPF) 750 receives the contents for the established multicast session. However, the received contents may not necessarily be considered as contents currently at the UPF 750. Rather, the received contents may be considered as contents being available for multicasting. Such available contents may be currently received at the UPF 750, but may also represent buffered contents received at a previous point of time.

The SMFs 400 that handle PDU sessions where a JOIN request (request for joining a terminal endpoint device, like e.g. a UE 710) for a multicast session is received (S771) subscribe in S772 at the UDR 740 to notifications of changes of that attribute. That is, they subscribe to notifications/to be notified, when content (first content) of a multicast session is received after a silence period. Such silence period may correspond to a period, in which no contents are available for multicasting. That is, not contents are received and/or no multicasting of buffered contents. Further, such silence period may be a configurable, e.g. predetermined/preset time period. That is, reception of contents/forwarding of buffered contents for the established multicast session may be limited to predetermined time windows.

The Ingress core node (e.g. Broadcast/Multicast Service Center, BM-SC) 400 for the multicast session configures in S773 the Ingress user plane node (e.g. UPF) 750 for the multicast session to report (providing a report) when a signaling data of a multicast session, e.g. the first PDU of the multicast session, is available, e.g. received, after a first configurable period, and to report (providing another report) afterward, if no contents are received for a second configurable period. The first configurable period may be equal to the second configurable period. The first configurable period may represent a time period, which starts with the availability (reception) of the signaling data, e.g. the first PDU of the multicast session, and which ends with the report being provided. The second configurable period may represent a time period, which starts with the ending of the availability of contents for the established multicast session (e.g. after the last reception of contents for the established multicast session) and which ends with the elapse of time configured for the second configurable period.

In S774, multicast data/contents are available, e.g. received, at the UPF 750.

The Ingress user plane node 750 notifies in S775 an Ingress core node 500 accordingly. It is to be noted that once configured, the UPF 750 may generally report to different core nodes, not exclusively to the Ingress core node 500 performing the configuration.

The Ingress core node 500 updates in S776 the attribute in the UDR 740 for the multicast session to indicate whether contents for the multicast session are available for multicasting. Thus, a group content status, which was set to "inactive" by a core network element (not shown in FIG. 7), like e.g. a network exposure function (NEF), is updated (changed/switched) into an "active" status.

The UDR 740 notifies in S777 the SMFs 400 that had subscribed to the change of the attribute.

The SMFs 400 receiving that notification request in S778 for all PDU sessions where they received a JOIN request for the multicast session a paging (S779) of the UE 710 (downlink data notification).

In S780, the UE 710 becomes connected and a RAN-Node 720 is selected. In S790, if the RAN-Node 720 does not yet receive multicast contents, distribution of multicast data is configured to RAN-Node 720. In S791, multicast data is forwarded to the UE 710.

Figure 8:
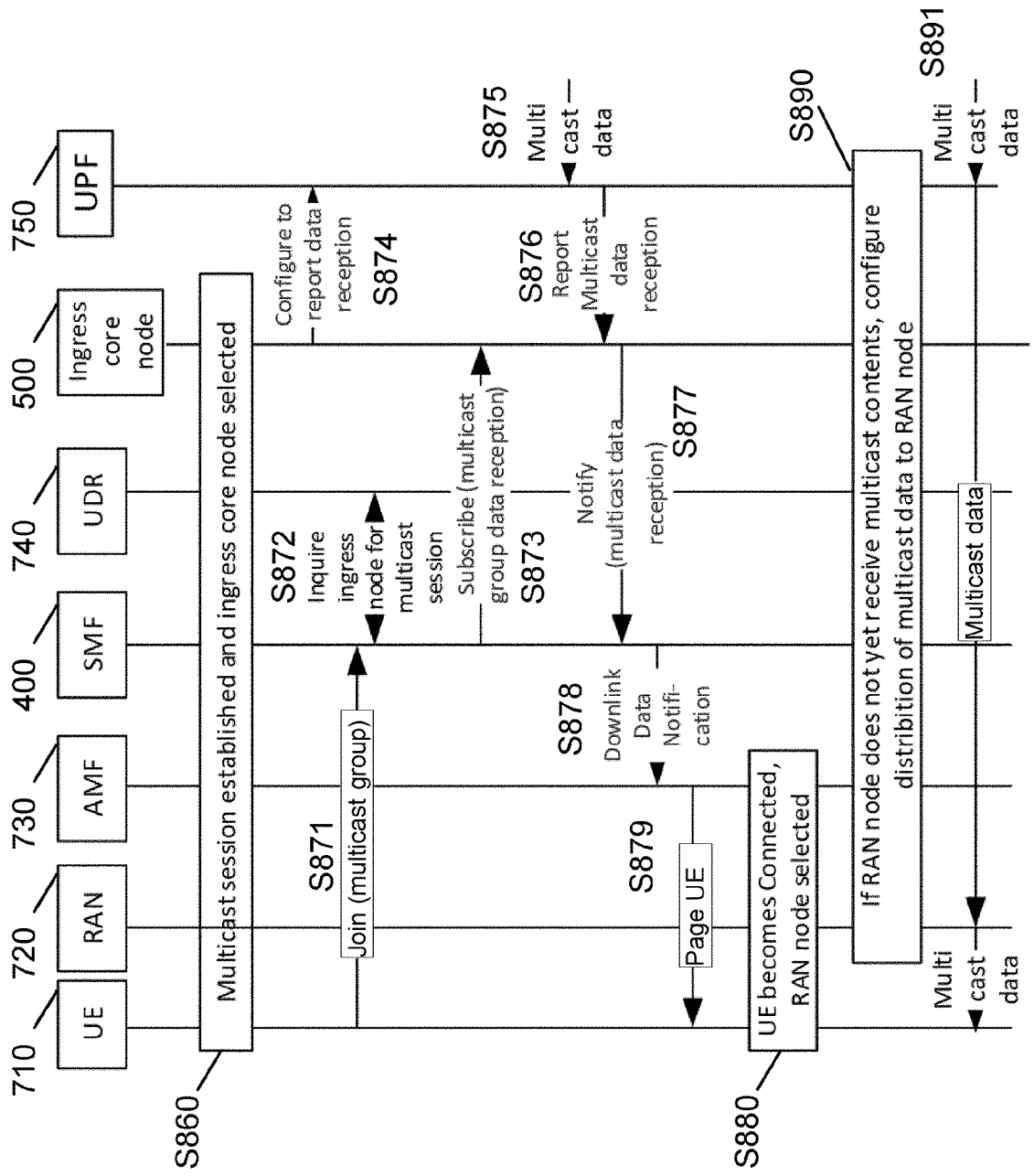
FIG. 8 shows a diagram schematically illustrating signaling flows according to various examples of embodiments.

FIG. 8 shows a diagram schematically illustrating signaling flows according to various examples of embodiments. The diagram according to FIG. 8 differs from the diagram according to FIG. 7 in the communication (subscription to notifications, reception of notifications) between the SMFs 400 and the Ingress core node 500. According to FIG. 7, such communication is executed via the UDR 740, wherein according to FIG. 8, such communication is executed directly between the SMFs 400 and the Ingress core node 500.

In particular, according to FIG. 8, the SMFs 400 that handle PDU sessions (S860) where a JOIN request for a multicast session is received in S871 subscribe in S873 at the Ingress core node 500 to notifications when (the first) content of a multicast session is received after a silence period. In S872, the SMFs 400 inquire an UDR 740 for the established multicast session.

The Ingress core node (e.g. SMF, BM-SC) 500 for the multicast session configures in S874 the Ingress user plane node (e.g. UPF) 750 for the multicast session to report (provide a report) if signaling data of a multicast session, e.g. the first PDU of the multicast session, is available, e.g. received, (S875) after a configurable period, and to report (provide another report) afterward if no contents are available, e.g. received, for a configurable period.

The Ingress user plane node 750 notifies in S876 the Ingress core node 500 accordingly.

The Ingress core node 500 notifies in S877 the SMFs 400 that subscribed that contents are available for multicasting for the multicast session.

The SMFs 400 receiving that notification request in S878 for all PDU sessions where they received a JOIN request for the multicast session a paging (S879) of the UE 710 (downlink data notification)

In S880, the UE 710 becomes connected and a RAN-Node 720 is selected. In S890, if the RAN-Node 720 does not yet receive multicast contents, distribution of multicast data is configured to RAN-Node 720. In S891, multicast data is forwarded to the UE 710.

The solution disclosed in the present specification applies to IDLE UEs, but can also be used for inactive UEs, in particular if the multicast distribution tree is not being updated for inactive UEs to avoid signaling.

Figure 9:
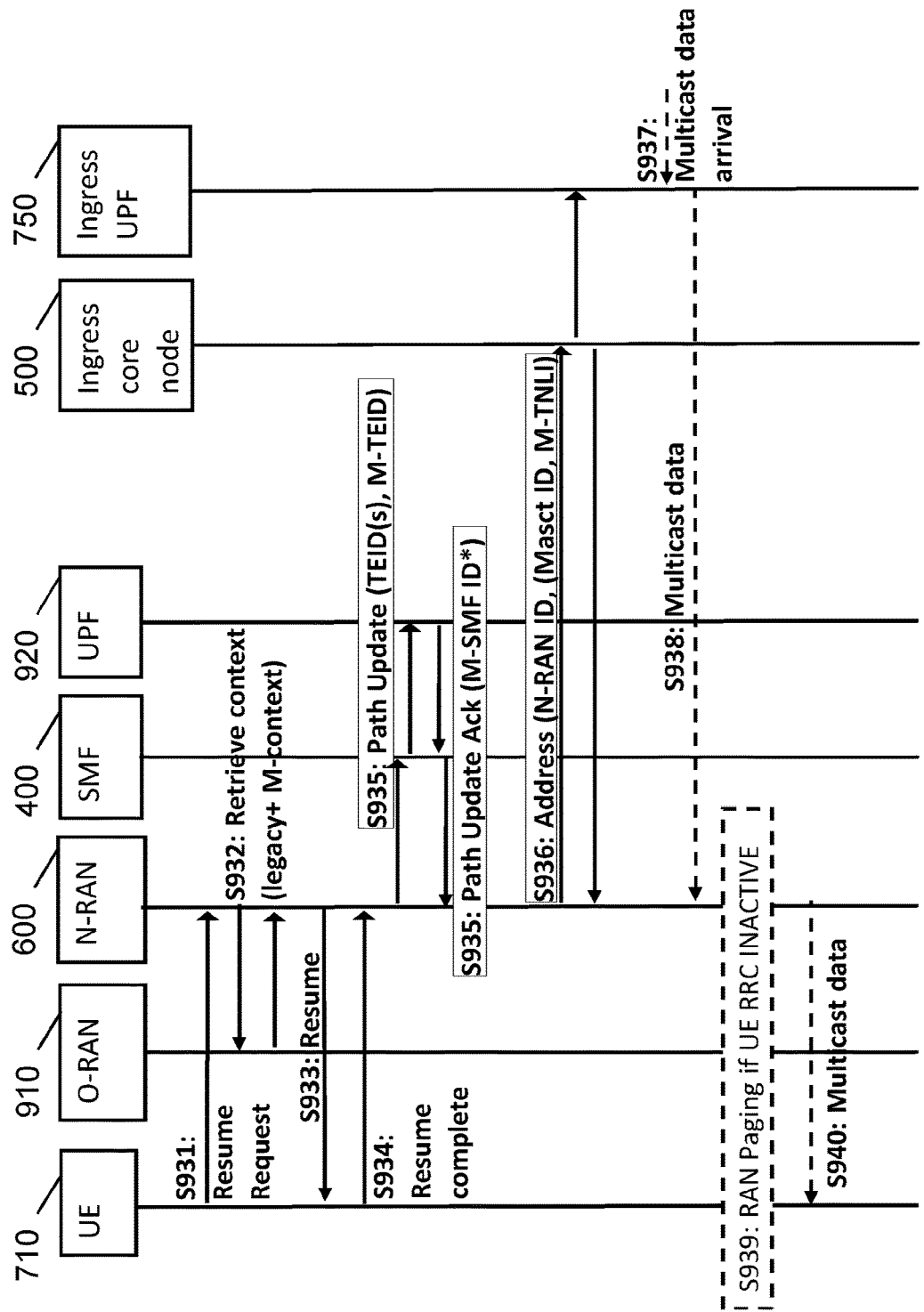
FIG. 9 shows a diagram schematically illustrating signaling flows according to various examples of embodiments.

FIG. 9 shows a diagram schematically illustrating signaling flows according to an example of embodiments.

For inactive UEs 710, it is possible that the multicast distribution tree is updated while the UE 710 is inactive toward the latest access network element 600, e.g. RAN node, serving the UE 710. If that RAN node (e.g. gNB) 600 receives multicast data via the multicast distribution tree while an UE 710 subscribed to the multicast session is inactive, it may page the UE 710 as illustrated in FIG. 9.

In particular, in S931, the UE 710 sends a resume request to a new access network element 600, e.g. a new NG-RAN node, because it exits the RAN Notification Area (RNA).

In S932, the new NG-RAN node 600 retrieves the UE 710 information (context; legacy+M-context) with respect to the UE 710 from old anchor NG-RAN node.

In S934 to S935, after the UE 710 has resumed in the new NG-RAN node 600, the new NG-RAN node 600 triggers a PATH SWITCH REQUEST message to AMF and SMF 400 to indicate that it is the new anchor NG-RAN node 600 to the AMF/SMF 400.

In S936, the new anchor NG-RAN node 600 also notifies the Ingress core node 500 that it is the new anchor NG-RAN node 600 to the AMF/SMF 400 and provides transport network information (TNLI) to be used to receive multicast data for the multicast session identified by the multicast session, Mcast, ID. The Ingress core node 500 updates the ingress UPF 750 with the received TNLI and Mcast ID.

In S937, S938, the multicast data is available, e.g. received for the session identified by the Mcast ID and the Ingress UPF 750 uses the received TNLI to deliver the multicast data to the new anchor NG-RAN node 600.

In S939, the new anchor NG-RAN node 600 triggers paging for the UE 710 if the UE is in an inactive mode, e.g. RRC_INACTIVE.

In S940, after the UE 710 transitions to connected state, the new anchor NG-RAN node 600 delivers the received multicast data to the UE 710.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus, comprising:
at least one processing circuitry; and
at least one memory for storing instructions to be executed by the at least one processing circuitry, wherein the at least one memory and the instructions are configured to, with the at least one processing circuitry, cause the apparatus at least to:
receive a request for joining a terminal endpoint device to an established multicast session;
based on the received request,
subscribe at a network entity to one or several notifications,
the one or several notifications indicating whether data to be transmitted for the established multicast session is available for multicasting;
obtain a subscribed notification from the network entity if data for the established multicast session is available for multicasting; and
responsive to the obtained subscribed notification,
issue for the established multicast session a downlink data notification for the terminal endpoint device,
wherein the at least one memory and the instructions are further configured to, with the at least one processing circuitry, cause the apparatus at least to:
receive another configured report, wherein the another configured report is to be received if no data to be transmitted is available for multicasting for a second predetermined period.

2. The apparatus according to claim 1, wherein
the network entity is a core network storage element; and
the at least one memory and the instructions are further configured to, with the at least one processing circuitry, cause the apparatus at least to
obtain the subscribed notification from an attribute information stored for the established multicast session in the core network storage element,
the attribute information indicating whether data to be transmitted is available for multicasting.

3. The apparatus according to claim 2, wherein
a multicast data transmission status assigned to the established multicast session is in an inactive status; and
if data to be transmitted for the established multicast session is available for multicasting,
the at least one memory and the instructions are further configured to, with the at least one processing circuitry, cause the apparatus at least to
obtain the subscribed notification from the attribute information,
the attribute information indicating a switching of the multicast data transmission status from the inactive status to an active status.

4. The apparatus according to claim 1, wherein
the network entity is a core network control element assigned to the established multicast session.

5. The apparatus according to claim 1,
wherein data to be transmitted for the established multicast session is available for multicasting after a silence period.

6. The apparatus according to claim 1, wherein
the at least one memory and the instructions are further configured to, with the at least one processing circuitry, cause the apparatus at least to
issue the downlink data notification for the terminal endpoint device being in an idle status or in an inactive status.

7. The apparatus according to claim 1, wherein the at least one memory and the instructions are further configured to, with the at least one processing circuitry, cause the apparatus at least to handle a Protocol Data Unit, PDU, session where the request for joining the terminal endpoint device is received; and issue for the established multicast session the downlink data notification for the handled PDU session.

8. An apparatus, comprising:

at least one processing circuitry; and at least one memory for storing instructions to be executed by the at least one processing circuitry, wherein the at least one memory and the instructions are configured to, with the at least one processing circuitry, cause the apparatus at least to:

wherein the apparatus is assigned to an established multicast session, configure a core network control element assigned to the established multicast session to provide one or several reports, the one or several reports indicating whether data to be transmitted for the established multicast session is available for multicasting;

obtain a configured report from the core network control element; and responsive to the obtained configured report, issue a notification indicting whether data to be transmitted for the established multicast session is available for multicasting, wherein the at least one memory and the instructions are further configured to, with the at least one processing circuitry, cause the apparatus at least to:

configure the core network control element to provide another configured report, wherein the another configured report is to be provided if no data to be transmitted is available for multicasting for a second predetermined period.

9. The apparatus according to claim 8, wherein the at least one memory and the instructions are further configured to, with the at least one processing circuitry, cause the apparatus at least to issue the notification by updating an attribute information stored for the established multicast session in a core network storage element, the attribute information indicating whether data to be transmitted is available for multicasting.

10. The apparatus according to claim 9, wherein a multicast data transmission status assigned to the established multicast session is in an inactive status; and if data for the established multicast session is available for multicasting, the at least one memory and the instructions are further configured to, with the at least one processing circuitry, cause the apparatus at least to update the attribute information by switching the multicast data transmission status from the inactive status to an active status.

11. The apparatus according to claim 8, wherein the at least one memory and the instructions are further configured to, with the at least one processing circuitry, cause the apparatus at least to, accept a subscribing request to notify a core network management element whether data to be transmitted for the established multicast session is available for multicasting; and issue the notification indicting whether data to be transmitted for the established multicast session is available to the core network management element.

12. The apparatus according to claim 8, wherein the at least one memory and the instructions are further configured to, with the at least one processing circuitry, cause the apparatus at least to, configure the core network control element for providing the configured report if signaling data indicating for the established multicast session the availability of data available for multicasting after a first predetermined period.

13. A method, comprising:

configuring a core network control element assigned to an established multicast session to provide one or several reports, the one or several reports indicating whether data to be transmitted for the established multicast session is available for multicasting;

obtaining a configured report from the core network control element; and responsive to the obtained configured report, issuing a notification indicting whether data to be transmitted for the established multicast session is available for multicasting, the method further comprising:

configuring the core network control element to provide another configured report, wherein the another configured report is to be provided if no data to be transmitted is available for multicasting for a second predetermined period.

14. The method according to claim 13, further comprising:

issuing the notification by updating an attribute information stored for the established multicast session in a core network storage element, the attribute information indicating whether data to be transmitted is available for multicasting.

* * * * *